(12) United States Patent  
Krol et al.

(10) Patent No.: US 7,277,204 B2  
(45) Date of Patent: Oct. 2, 2007

(54) STOCHASTIC HALFTONE SCREENING METHOD

(75) Inventors: Alexander Krol, Natania (IL); Alex Weiss, Kadima (IL)

(73) Assignee: Kodak IL Ltd., Petach Tikva ( * ) Notice: Subject to any disclaimer, the term of this patent is extended or adjusted under 35 U.S.C. 154(b) by 936 days.

(21) Appl. No.: 10/630,844

(22) Filed: Jul. 31, 2003

(65) Prior Publication Data

US 2005/0024685 A1    Feb. 3, 2005

(51) Int. Cl.  
*H04N 1/405* (2006.01)

(52) U.S. Cl. .................................. 358/3.13; 358/3.19

(58) Field of Classification Search .............. 358/1.9, 358/3.06, 3.13–3.17, 3.19, 3.21–3.22, 466; 382/270  
See application file for complete search history.

(56) References Cited

U.S. PATENT DOCUMENTS

| 5,469,268 | A | 11/1995 | Neuhoff et al. |
| 5,473,439 | A | 12/1995 | Pappas |
| 5,682,442 | A | 10/1997 | Johnston et al. |
| 6,710,778 | B2 | 3/2004 | Cooper |
| 2005/0219628 | A1* | 10/2005 | Yasutomi et al. .......... 358/3.16 |
| 2006/0197992 | A1* | 9/2006 | Wang ........................ 358/3.19 |

FOREIGN PATENT DOCUMENTS

JP      2002044446 A *  2/2002

* cited by examiner

*Primary Examiner*—Scott A. Rogers  
(74) *Attorney, Agent, or Firm*—Nelson Adrian Blish

(57) ABSTRACT

A method of building threshold matrices for stochastic screening by using the actual size and shape of imaged pixel and/or pixel agglomerate instead of the nominal one, in the stage of calculating appropriate threshold matrices. For each relevant combination of imager and imaged media, a matrix with desirable blue-noise-like characteristics is created from actual imaged pixels and/or pixel agglomerates, taking into account their overlap when placed in close proximity.

10 Claims, 6 Drawing Sheets

STOCHASTIC HALFTONE SCREENING METHOD

FIELD OF THE INVENTION

The present invention relates to halftone screening, and more specifically to a new method for stochastic screening.

BACKGROUND OF THE INVENTION

The process of generating a binary image from a continuous-tone image is often referred to as screening and is often implemented by comparing continuous-tone pixel values with those of a dither matrix of threshold values, commonly referred to as "screen".

Stochastic screening, otherwise known as frequency-modulated screening or dispersed-dithered screening, is based on producing a well-dispersed pattern of isolated dots at spaced pixel locations, the average surface coverage by these dots being equal to a continuous-tone image gray level value represented in a specific location.

Various methods exist for generating stochastic screens. They can be generally divided into two broad categories: data-dependent ones (such as "error diffusion" methods) and data-independent ones, based on repetitive matrix patterns.

Data-dependent screening methods, being easy to implement and computationally inexpensive, exhibit quasi-periodic patterns visible to the human eye; when used on high-resolution imaging devices, the spatial frequencies of prevailing local quasi-periodic patterns are such that the resulting effect provides an unpleasant visible appearance. Such methods are therefore used mostly on low-resolution printing devices.

Repetitive matrix-based methods are better suited for high-resolution imaging devices, such as imagesetters, platesetters, digital printing presses and high-resolution inkjet printers. Several different factors reduce image quality when using repetitive matrix-based stochastic screens.

First, high-resolution frequencies, present in the pixel distribution inside the matrix, contribute to an overall "noisy" appearance of the image, especially on relatively large areas with a uniform gray level.

Second, practically applicable repetitive matrix sizes are such that at high output resolutions the spatial frequency of the matrix repetition produces a highly visible and unpleasant pattern. This is caused by local non-uniformities, when multiplied step-and-repeat fashion in two orthogonal directions.

Third, the existence of local non-uniformities may depend on the imaged media properties, since imaged pixel growth beyond its nominal border is affected both by media characteristics and by its environment in terms of imaged and non-imaged area, due to pixel-to-pixel interaction.

Thus, there is a desire to construct a halftone screen, which minimizes undesirable imaging artifacts for a given imaging media while maintaining the favorable characteristics of a stochastic screen.

SUMMARY OF THE INVENTION

In one aspect of the present invention, there is provided a method of creating a threshold matrix for stochastic screening, comprising the steps of:
  providing a digital halftone image representation;
  printing said halftone image;
  obtaining dot-gain measurements of pixels of said printed image; and
  using said obtained dot-gain measurements for creating an improved threshold matrix.

In a preferred embodiment, the step of obtaining dot-gain measurements comprises obtaining dot-gain measurements of pixel agglomerates.

In another aspect of the present invention there is provided a method of creating a threshold matrix for stochastic screening for an initial target gray level, comprising the steps of:
  i. providing an initial threshold matrix;
  ii. providing a merit function;
  iii. providing a geometrical function;
  iv. calculating the value of said merit function for all non-filled pixels in said matrix;
  v. filling one of said pixels for which the value of said merit function is highest;
  vi. updating values of all pixels in said matrix adjacent to said filled pixel according to said geometrical function;
  vii. calculating effective percentage of surface coverage in said matrix;
  viii. comparing said calculated effective coverage with said target gray level;
  ix. repeating steps (d) through (h) until said effective coverage is greater or equal to said target gray level; and
  x. storing said matrix.

In one embodiment, the method additionally comprises the steps of:
  providing said stored matrix;
  providing a new target gray level, said new target gray level higher than said initial target gray level; and
  performing said steps (d) through (i).

In yet another aspect of the present invention there is provided a method of creating a threshold matrix for stochastic screening for an initial target gray level, comprising the steps of:
  i. providing a threshold matrix representing a nominal screen pattern for said target gray level;
  ii. providing a merit function;
  iii. providing a geometrical function;
  iv. updating values of all non-filled pixels in said matrix according to said geometrical function;
  v. calculating a value M1 of said merit function for all filled pixels in said matrix;
  vi. calculating a value M2 of said merit function for all non-filled pixels in said matrix;
  vii. calculating a global value G1 for said merit function for all pixels in matrix;
  viii. swapping values of pixels with highest M1 and M2 values, respectively;
  ix. updating values of all non-filled pixels in said matrix affected by said swapping according to said geometrical function;
  x. calculating a global value G2 of said merit function for all pixels in said matrix;
  xi. comparing G1 with G2;
  xii. repeating said steps (e) through (k) until said global value G2 is smaller than said global value G1;
  xiii. restoring said swapped values;
  xiv. calculating effective percentage of surface coverage in said matrix; and
  xv. storing said matrix.

In one embodiment, the method additionally comprises the steps of:
  p. providing said stored matrix;
  q. providing a new target gray level, said new target gray level higher than said initial target gray level;

r. calculating a value M2 of said merit function for all non-filled pixels in said matrix;

s. filling one of said pixels for which said merit function is highest;

t. updating values of all non-filled pixels in said matrix adjacent to said filled pixel according to said geometrical function;

u. calculating effective percentage of surface coverage in said matrix;

v. comparing said calculated effective coverage with said new target gray level;

w. repeating steps (r) through (v) until said effective coverage is greater or equal to said new target gray level; and x. storing said matrix.

In another embodiment the method additionally comprises the steps of:

xvi. providing said stored matrix;

xvii. providing a new target gray level, said new target gray level lower than said initial target gray level;

xviii. calculating a value M1 of said merit function for all filled pixels in said matrix;

xix. removing one of said pixels for which said value M1 is highest;

xx. updating values of all non-filled pixels in said matrix adjacent to said removed pixel according to said geometrical function;

xxi. calculating effective percentage of surface coverage in said matrix;

xxii. comparing said calculated effective coverage with said new target gray level;

xxiii. repeating steps (r) through (v) until said effective coverage is greater or equal to said new target gray level; and xxiv. storing said matrix.

According to a further embodiment of the present invention, the merit function represents dot-gain of pixels and/or pixel agglomerates.

According to yet another embodiment of the present invention, the geometrical function represents halftone dot shapes, such as a square or a circle.

DETAILED DESCRIPTION OF THE INVENTION

The present invention deals with the aforementioned limitations of existing stochastic screening methods by using the actual size and shape of imaged pixel and/or pixel agglomerate instead of the nominal one, in the stage of calculating appropriate threshold matrices. For each relevant combination of imager and imaged media, a matrix with desirable blue-noise-like characteristics is created from actual imaged pixels and/or pixel agglomerates, taking into account their overlap when placed in close proximity (as in midtone and shadow image regions). Such matrix produces, for a target combination of imager and imaged media—for each threshold level of an image—an imaged pattern with desirable spatial characteristics and with surface coverage substantially equal to the one required by the gray level being imaged.

In the following description:

"Dot pattern" refers to a product or an image resulting from a halftoning or screening process.

A "nominal screen pattern" for a given gray level refers to a binary pattern of 1's and 0's identifying the location of the "ON" (black) and "OFF" (white) pixels, respectively, in a binary dot pattern for the given gray level.

A "filled pixel" refers to the "ON" (black) pixel in a dot pattern.

A "partially filled pixel" refers to an "OFF" (white) pixel adjacent to one or more filled pixels and being partially covered with the image due to filled pixel growth beyond its nominal borders ("dot gain").

A "free pixel" refers to an "OFF" pixel having no adjacent filled pixels.

A "non-filled" pixel refers to a free or partially-filled pixel.

A filled pixel's value is equal to 1 for the purpose of this discussion, such a pixel being 100% covered with image.

A free pixel's value is equal to 0 for the purpose of this discussion, such a pixel being 0% covered with image.

A partially-filled pixel may have a value in the range from 0 to 1, its coverage percentage being defined by its environment of filled, partially filled and free pixels.

Figure 3A:
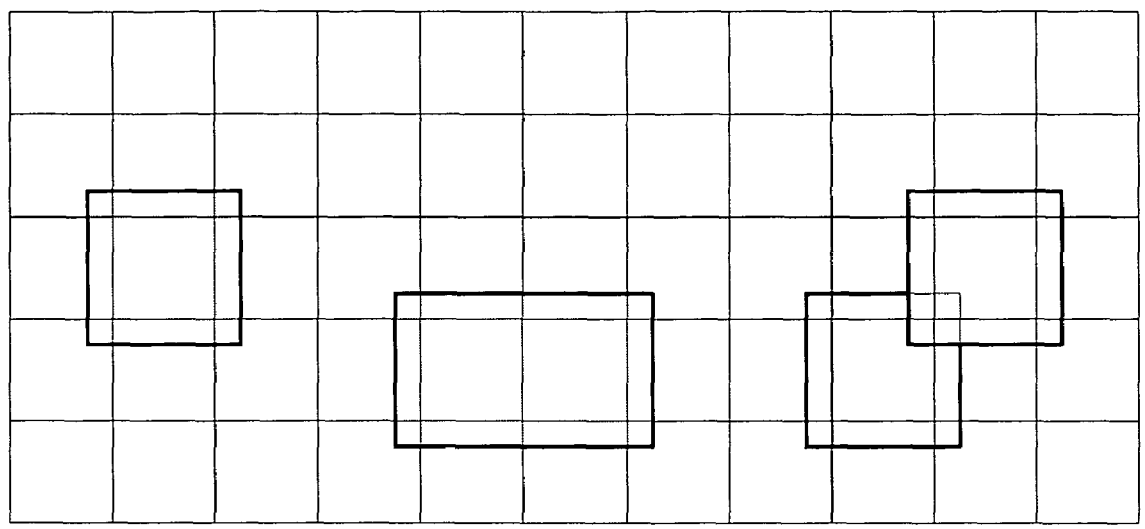
FIGS. 3A and 3B show geometrical representations of imaged pixels' propagation into adjacent pixels.

For the purpose of this discussion, filled pixel's propagation into adjacent pixels is approximated by a geometric shape, described by an analytical function $F(x,y)$. For example, in case of a square geometric shape, as shown in FIG. 3a, assuming device resolution Res, dot gain $Dg>=0$ and system of coordinates starting at the center of an isolated filled pixel being described, we have:

Nominal pixel side length $a=1/res$;

Nominal pixel area $Snom=a*a$;

Actual pixel area $Sact=Snom*(1+Dg)$;

Actual pixel side length $b=sqrt(Sact)$, $b>=a$; and

Actual pixel borders are described by four equations:

$$x=-b/2;\ x=+b/2;\ y=b/2 \text{ and } y=+b/2, \text{ respectively.}$$

Figure 3B:
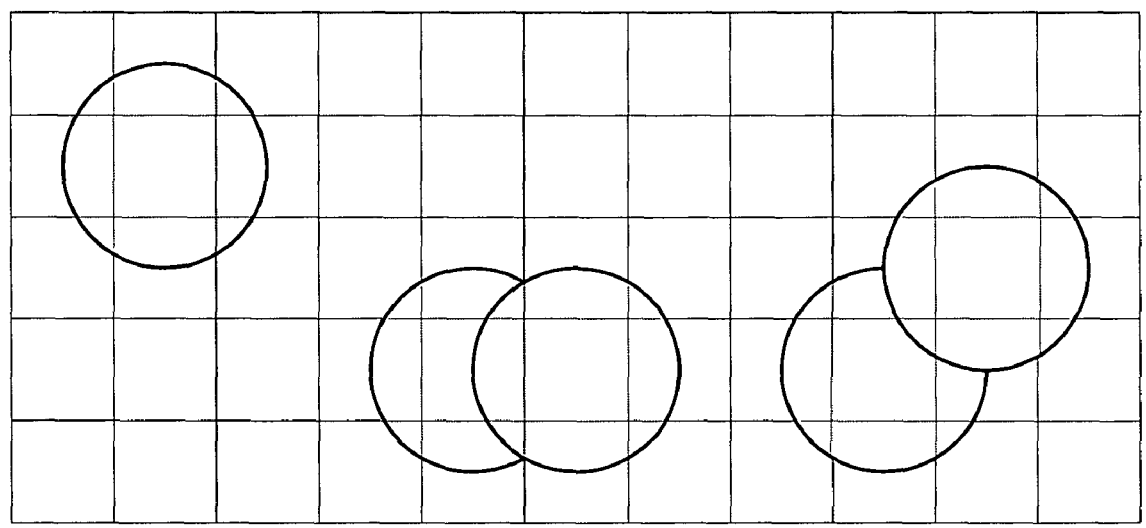

In case of a round geometric shape (FIG. 3b) under the same assumptions and denoting actual pixel radius as Ract, we have:

Actual pixel area $Sact=\pi*Ract*Ract$;

Actual pixel radius $Ract=sqrt(Sact/\pi)$; and

Actual pixel is described by equation:

$$(x*x)/(Ract*Ract)+(y*y)/(Ract*Ract)=1.$$

Following is a description of a general method for generating a halftone screen for converting an image received at d levels into a dot pattern at c levels, where $c<=d$, according to the present invention. The method consists of building a threshold matrix according to actual characteristics of the imaging device (such as pixel shape and physical dot gain), by using actual dot pattern instead of nominal dot pattern at every algorithm step dealing with choosing position for dot placement, such as merit comparisons of alternative possible dot placement positions, and substituting the actual dot pattern for a nominal dot pattern at every subsequent step of the algorithm for creating the chosen threshold matrix.

Figure 1:
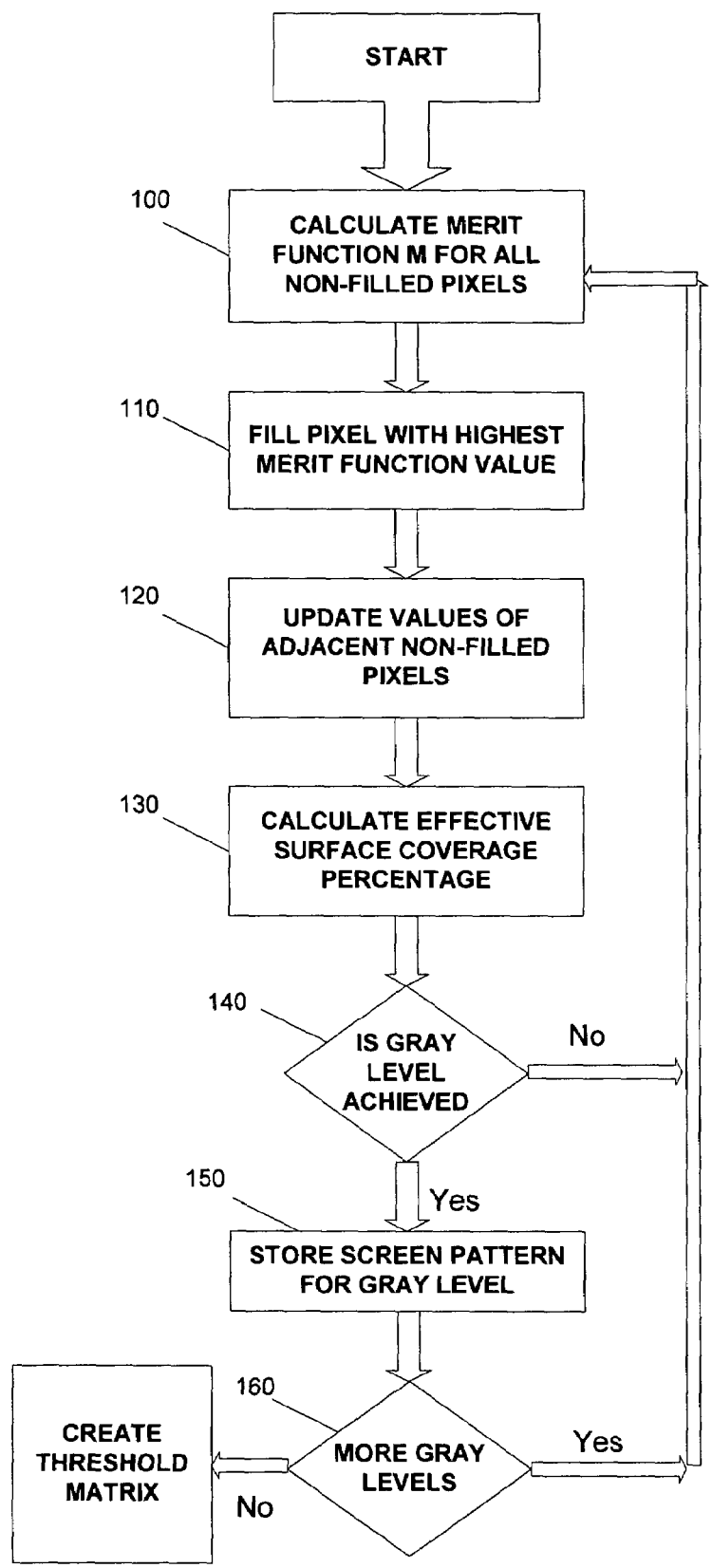
FIG. 1 is a flowchart illustrating one embodiment of the present invention.

FIG. 1 is a flowchart illustrating one exemplary embodiment of the present invention. In this embodiment, the stochastic screen patterns are built from scratch; namely, the process starts with an empty matrix. In step 100, a merit function is calculated for all non-filled pixels in the matrix. In step 110, the pixel with the highest merit function value is filled, followed by updating the values of all adjacent non-filled pixels (step 120). In step 130, the effective surface coverage percent is calculated and compared, in step 140, with the required gray level. If the required gray level has not been reached yet, the process returns to step 100 for further filling of the matrix. Otherwise, if the required gray level, or its nearest system value has been achieved, the stochastic screen pattern for that gray level is saved, in step 150. If more stochastic screen patterns are required, for additional higher (darker) gray levels, the process returns to step 100, to create the next stochastic screen pattern from the previously calculated one. The embodiment of FIG. 1 is suitable for a process of creating stochastic screen pattern for a monotonous series of gray levels, starting from the brightest level and ending with the darkest level in the series. The screen patterns created by the process of FIG. 1 are combined to create a threshold matrix.

Figure 2A:
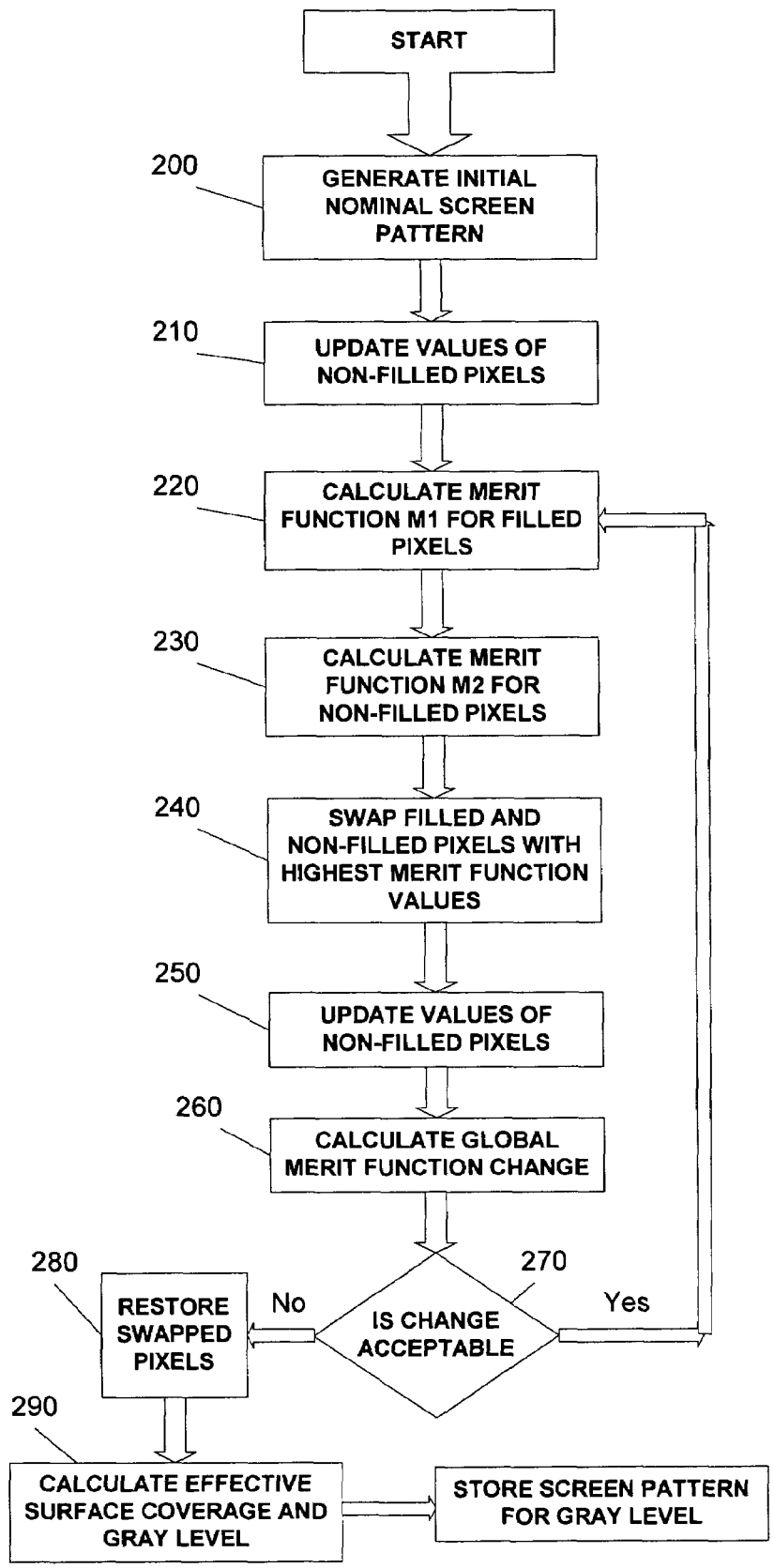
FIGS. 2A through 2C are flowcharts illustrating another embodiment of the present invention.
Figure 2B:
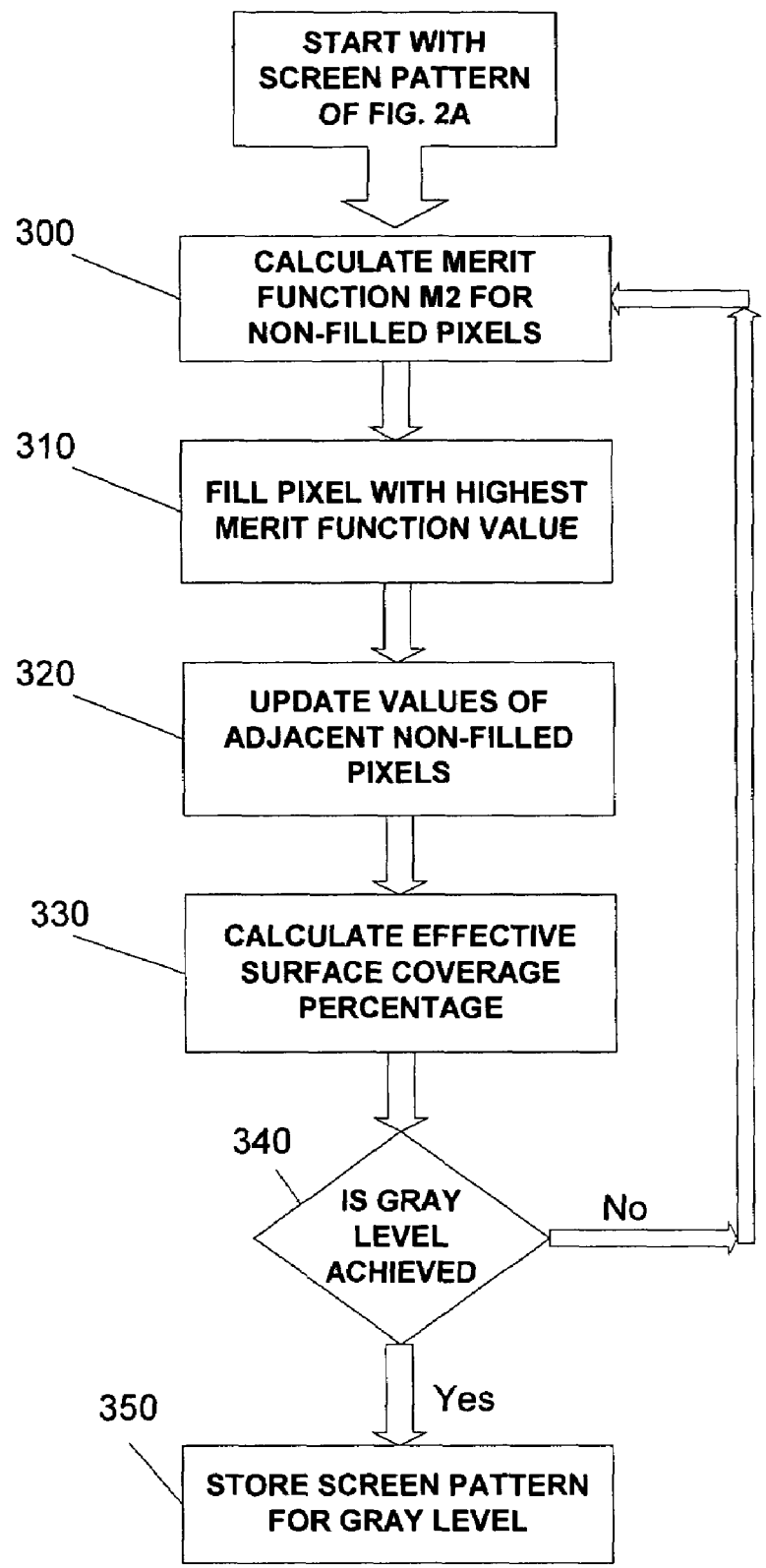
Figure 2C:
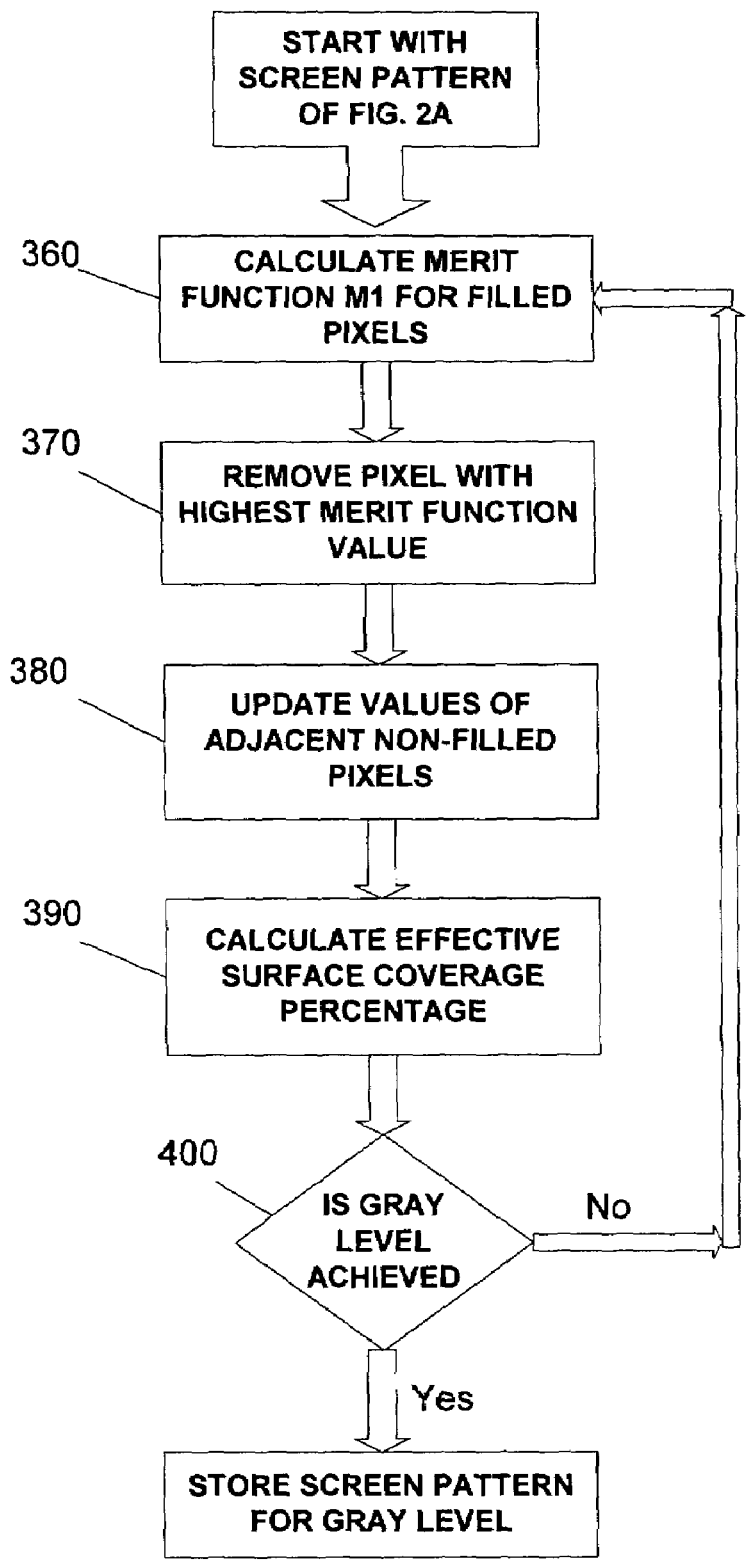

FIGS. 2A through 2C are flowcharts illustrating another embodiment of the present invention. In this embodiment, the process of creating stochastic screen patterns starts with an existing nominal pattern for some nominal system value Vstart. This nominal pattern may have been created by any known method for creating stochastic screen patterns.

The flowchart of FIG. 2A represents the first stage of the process, in which the existing nominal pattern for system value Vstart is transformed to a screen pattern according to the present invention. In step 210, the values of non-filled pixels adjacent (having a common side or corner) to filled pixels are updated, according to the relevant geometrical function F(x,y), followed by calculation of merit function M1 for all filled pixels (step 220), to find a best candidate for removal, and calculation of merit function M2 for all non-filled pixels (step 230), to find a best candidate for filling. In step 240, the pixel with the highest M1 value is swapped with the pixel with the highest M2 value and in step 250 values of non-filled pixels are updated accordingly. The global merit function is now calculated (step 260) and the difference ΔM between the previous and new merit functions is tested for acceptability (step 270). ΔM will be acceptable as long as it is positive, namely, the overall merit value is increasing, or till some other predefined optimization criterion is reached. If the difference ΔM is acceptable, the process returns to step 220, to try to further optimize the screen pattern. Otherwise, the last swap is retracted in step 280 and the effective surface coverage and gray level of the created screen pattern are calculated (step 290). The process terminates with a created screen pattern for some actual system value Vact, generally not equal to Vstart. The screen pattern is saved for the nominal value Vact.

Starting from the screen pattern created for the system value Vact in the process of FIG. 2A, the process may now proceed to create screen patterns for higher and/or lower system values, as described hereinbelow with reference to FIGS. 2B and 2C.

In FIG. 2B, screen patterns are created for gray levels with higher black percentage. Starting with the previously created screen pattern, merit function M2 for all non-filled pixels is calculated in step 300. In step 310 the pixel with the highest merit function value is filled, followed by updating the values of all adjacent non-filled pixels (step 320). In step 330 the new effective surface coverage percent is calculated. The effective surface coverage is compared with the required gray level in step 340. If the required gray level has not been achieved yet, the process returns to step 300 for further filling. Otherwise, the created screen pattern is stored for the nominal gray level and the process returns to step 300, to create the screen pattern for the next (darker) gray level.

Similarly, in FIG. 2C, screen patterns are created for gray levels with smaller black percentage. Starting with the previously created screen pattern of FIG. 2A, merit function M1 for all filled pixels is calculated in step 360. In step 370 the pixel with the highest merit function value is removed, followed by updating the values of all adjacent non-filled pixels (step 380). In step 390 the new effective surface coverage percent is calculated. The effective surface coverage is compared with the required gray level in step 400. If the required gray level has not been achieved yet, the process returns to step 360 for further removing. Otherwise, the created screen pattern is stored for the nominal gray level and the process returns to step 360, to create the screen pattern for the next (brighter) gray level.

The screen patterns created by the processes of FIGS. 2A through 2C are combined to create a threshold matrix.

The merit function in the above description relates to the relative desirability of choosing a specific non-filled pixel as a candidate for filling, as compared with other pixels from a plurality of non-filled pixels or, alternatively, the relative desirability of choosing a specific filled pixel as a candidate for converting to a non-filled pixel, as compared to other pixels from a plurality of filled pixels. The merit function may be constructed using any known method of creating stochastic screen pattern, for example, void-and-cluster method.

One possible implementation of a merit function is described herein below. Assume we are creating a threshold matrix of size S. Then, let's define a matrix K[2n+1][2n+1] of weight coefficients, such that matrix coefficient K(n,n)—a central one—is equal to 0 and 2n+1<S.

On each subsequent stage of the matrix creation we have a corresponding pixel-map matrix Pmap[S][S], such that Pmap[i][j]=1 if pixel p[i][j] is filled and Pmap[i][j]=0 if pixel p[i][j] is not filled; we additionally have a corresponding matrix V[S][S], representing black coverage of respective pixels, so that V(i,j)=1 for a filled pixel and 0<=V(i,j)<1 for a non-filled pixel (in case of zero dot gain and absence of propagation of filled pixel into adjacent non-filled pixels, V(i,j) for a non-filled pixel is equal to 0).

Merit function M(p,q) for a non-filled pixel P(p,q) with coordinates (p,q) would then be:

$$M(p, q) = \sum_{0<=a<2n+1} \sum_{0<=b<2n+1} K(a, b) * (1 - V((p - n + a) \bmod (S), (q - n + b) \bmod (S))),$$

where V(c,d) is a level of black coverage of a pixel with coordinates (c,d), 0<=V(c.d)<=1. (1−V(c,d)) is, thus, the fraction of white in a pixel with coordinates (c,d).

For example, let n=1, 2n+1=3 and matrix K[3][3]={{1,2,1},
 {2,0,2,},
 {1,2,1}};

and let the relevant part of pixel-map matrix Pmap in the vicinity of pixel P(p,q) be, for example

|       | p − 1 | p | p + 1 |
|-------|-------|---|-------|
| q − 1 | 0     | 1 | 0     |
| q     | 1     | 0 | 0     |
| q + 1 | 0     | 1 | 0     | where p+1<S, q+1<S.

(Note that column and line numeration in this example starts from 0.) Assuming dot gain 0 (no propagation from filled pixels to adjacent non-filled pixels), the corresponding part of matrix V will be equal to pixel-map matrix Pmap. Then:

$$M(p, q) = \sum_{0<=a<3}\sum_{0<=b<3} K(a, b) * (1 - V((p - 1 + a)\mod(S),$$

$$(q - 1 + b)\mod(S)))$$

$$= K(0, 0) * (1 - V(p - 1, q - 1)) + K(0, 1) *$$

$$(1 - V(p - 1, q)) + K(0, 2) * (1 - V(p - 1, q + 1)) +$$

$$K(1, 0) * (1 - V(p, q - 1)) + K(1, 1) * (1 - V(p, q)) +$$

$$K(1, 2) * (1 - V(p, q + 1)) + K(2, 0) *$$

$$(1 - V(p + 1, q - 1)) + K(2, 1) * (1 - V(p + 1, q)) +$$

$$K(2, 2) * (1 - V(p + 1, q + 1))$$

$$= 1 * (1 - 0) + 2 * (1 - 1) + 1 * (1 - 0) + 2 * (1 - 1) +$$

$$0 * (1 - 0) + 2 * (1 - 0) + 1 * (1 - 0) + 2 * (1 - 1) + 1 *$$

$$(1 - 0) = 6.$$

Figure 4:
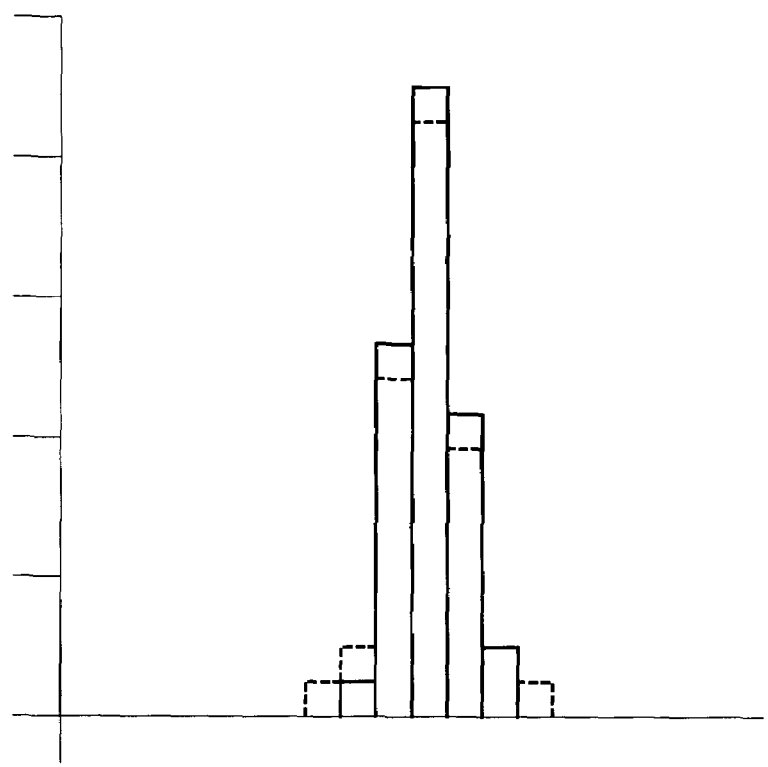
FIG. 4 is a histogram showing surface coverage uniformity for prior arts stochastic screen.

FIG. 4 is a diagram of the distribution of the coverage percentage of 4×4 pixel tiles, 50% black. The dashed line denotes use of prior art matrix with an appropriate X-curve. The solid line denotes use of a matrix built according to the method of the present invention.

Figure 5:
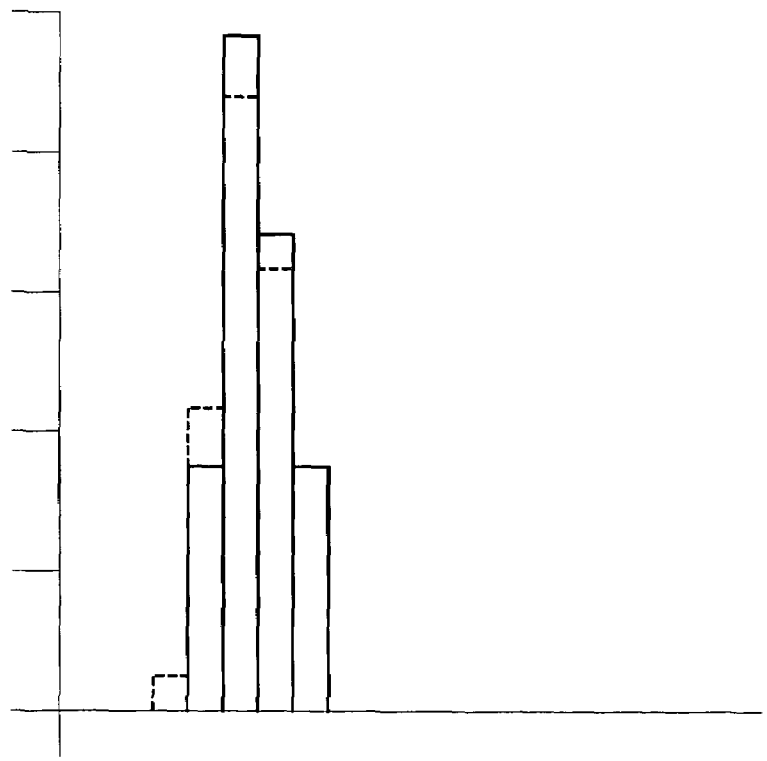
FIG. 5 is a histogram showing surface coverage uniformity for the stochastic screen of the present invention.

FIG. 5 is a diagram of the distribution of the coverage percentage of 4×4 pixel tiles, 33% black. The dashed line denotes use of prior art matrix with an appropriate X-curve. The solid line denotes use of a matrix built according to the method of the present invention.

The invention claimed is:

1. A method of creating a threshold matrix for stochastic screening, comprising the steps of:
   providing a digital halftone image representation;
   printing said halftone image;
   obtaining dot-gain measurements of pixels of said printed image;
   using said obtained dot-gain measurements for creating an improved threshold matrix; and
   wherein said step of obtaining dot-gain measurements comprises obtaining dot-gain measurements of pixel agglomerates.

2. A method of creating a threshold matrix for stochastic screening for an initial target gray level, comprising the steps of:
   a. providing an initial threshold matrix;
   b. providing a merit function;
   c. providing a geometrical function;
   d. calculating the value of said merit function for all non-filled pixels in said matrix;
   e. filling one of said pixels for which the value of said merit function is highest;
   f. updating values of all pixels in said matrix adjacent to said filled pixel according to said geometrical function;
   g. calculating effective percentage of surface coverage in said matrix;
   h. comparing said calculated effective coverage with said target gray level;
   i. repeating steps (d) through (h) until said effective coverage is greater or equal to said target gray level; and
   j. storing said matrix.

3. The method of claim 2, additionally comprising the steps of:
   providing said stored matrix;
   providing a new target gray level, said new target gray level higher than said initial target gray level; and
   performing said steps (d) through (i).

4. A method of creating a threshold matrix for stochastic screening for an initial target gray level, comprising the steps of:
   a. providing a threshold matrix representing a nominal screen pattern for said target gray level;
   b. providing a merit function;
   c. providing a geometrical function;
   d. updating values of all non-filled pixels in said matrix according to said geometrical function;
   e. calculating a value M1 of said merit function for all filled pixels in said matrix;
   f. calculating a value M2 of said merit function for all non-filled pixels in said matrix;
   g. calculating a global value G1 for said merit function for all pixels in matrix;
   h. swapping values of pixels with highest M1 and M2 values, respectively;
   i. updating values of all non-filled pixels in said matrix affected by said swapping according to said geometrical function;
   j. calculating a global value G2 of said merit function for all pixels in said matrix;
   k. comparing G1 with G2;
   l. repeating said steps (e) through (k) until said global value G2 is smaller than said global value G1;
   m. restoring said swapped values;
   n. calculating effective percentage of surface coverage in said matrix; and
   o. storing said matrix.

5. The method of claim 4, additionally comprising the steps of:
   p. providing said stored matrix;
   q. providing a new target gray level, said new target gray level higher than said initial target gray level;
   r. calculating a value M2 of said merit function for all non-filled pixels in said matrix;
   s. filling one of said pixels for which said merit function is highest;
   t. updating values of all non-filled pixels in said matrix adjacent to said filled pixel according to said geometrical function;
   u. calculating effective percentage of surface coverage in said matrix;
   v. comparing said calculated effective coverage with said new target gray level;
   w. repeating steps (r) through (v) until said effective coverage is greater or equal to said new target gray level; and
   x. storing said matrix.

6. The method of claim 4, additionally comprising the steps of:
p. providing said stored matrix;
q. providing a new target gray level, said new target gray level lower than said initial target gray level;
r. calculating a value M1 of said merit function for all filled pixels in said matrix;
s. removing one of said pixels for which said value M1 is highest;
t. updating values of all non-filled pixels in said matrix adjacent to said removed pixel according to said geometrical function;
u. calculating effective percentage of surface coverage in said matrix;
v. comparing said calculated effective coverage with said new target gray level;
w. repeating steps (r) through (v) until said effective coverage is greater or equal to said new target gray level; and
x. storing said matrix.

7. The method according to any one of claims 2-6, wherein said merit function represents dot-gain of pixels and/or pixel agglomerates.

8. The method according to any one of claims 2-6, wherein said geometrical function represents halftone dot shapes.

9. The method of claim 8, wherein said geometrical function is a square.

10. The method of claim 8, wherein said geometrical function is a circle.

* * * * *